United States Patent [19]
Hendriks

[11] Patent Number: 5,942,219
[45] Date of Patent: Aug. 24, 1999

[54] COMPOSITION FOR INHIBITING MICROBIAL ADHESION ON SURFACES

[75] Inventor: William A. Hendriks, Jacksonville, Fla.

[73] Assignee: BetzDearborn Inc., Trevose, Pa.

[21] Appl. No.: 08/993,085

[22] Filed: Dec. 9, 1997

[51] Int. Cl.$^6$ .............................. B01F 17/10; A61K 31/74
[52] U.S. Cl. ........................... 424/78.09; 106/2; 252/353
[58] Field of Search .................... 424/405, 78.08, 424/78.09, 78.37; 106/2, 287.35; 252/353; 514/772, 772.1, 772.3

[56] References Cited

U.S. PATENT DOCUMENTS

| | | | |
|---|---|---|---|
| 4,153,549 | 5/1979 | Wang et al. | 210/729 |
| 4,169,061 | 9/1979 | Carver et al. | 252/8.81 |
| 4,469,603 | 9/1984 | Lepain et al. | 210/749 |
| 4,492,589 | 1/1985 | Schick et al. | 44/280 |
| 5,512,186 | 4/1996 | Wright et al. | 210/764 |
| 5,512,211 | 4/1996 | McSwigan et al. | 252/353 |
| 5,593,599 | 1/1997 | Wright et al. | 210/764 |
| 5,618,468 | 4/1997 | Canevari et al. | 516/63 |
| 5,700,768 | 12/1997 | Lu | 510/214 |
| 5,858,281 | 1/1999 | Dellinger, Jr. et al. | 510/356 |

FOREIGN PATENT DOCUMENTS 7-308136  11/1995  Japan.

*Primary Examiner*—Robert H. Harrison
*Attorney, Agent, or Firm*—Richard A. Paikoff

[57] ABSTRACT

A composition for controlling deposition having a high flash point and being substantially free of volatile organic compounds is disclosed, the composition being a stable solution containing a dialkylsulfosuccinate, an ethylene oxide/propylene oxide block copolymer and a mineral acid.

15 Claims, No Drawings

COMPOSITION FOR INHIBITING MICROBIAL ADHESION ON SURFACES

FIELD OF THE INVENTION

The present invention relates to a composition containing a stable, high actives solution of a dialkylsulfosuccinate and a nonionic ethylene oxide/propylene oxide block copolymer, the formulation being free of water, oils and alcohols.

BACKGROUND OF THE INVENTION

Bacterial attachment to surfaces in virtually any nonsterile aquatic environment is a well-established phenomenon. Industrial efforts to prevent colonization or to clean fouled surfaces amount to costly expenditures in a number of industrial sectors. Often, such expenditures are made for cleaning programs that include the use of surfactants. Surfactants are regularly employed in water treatment programs as agents believed to play a role in the removal of organic masses from surfaces, in the enhancement of biocide efficacy or in the assistance in the water miscibility of various biocidal agents. Surfactants are also regularly used in the agrichemical business, particularly to enhance the action of herbicides. This is accomplished by using the surfactants to alter the surface behavior of the applied droplets, maximizing their interaction with the leaf surface.

One of the desirable benefits of many surfactants is their relative handling safety due to the low mammalian toxicity of many of these compounds. Additionally, many surfactants are also biodegradable. These properties have resulted in increased attention being paid to these materials as process treatment chemicals that may allow for the reduction or elimination of some proportion of the less environmentally sensitive compounds currently in regular use.

There are numerous examples of surfactants which are able to inhibit the colonization of surfaces by inhibiting the overall growth of the organisms in the target environment. Most surfactants, regardless of class, show some inhibition of surface colonization when used at concentrations high enough to impede bacterial growth. In the water treatment industry, the most well known surfactants which impart a measure of colonization resistance to submerged surfaces are the cationic quaternary amine surfactants, which also function as biocides. However, even the relatively mild nonionic surfactants can exhibit toxic effects upon microbes, e.g., bacteria or fungi; the concentration of nonionic surfactants necessary to mediate toxicity is typically substantially higher than for cationic surfactants, however.

In addition, the use of surfactants at high concentrations typically results in the discharge of large amounts of the surfactant into water treatment facilities or into the environment. Depending on the specific surfactant, the release of large quantities of these materials into the ground water may have significant environmental consequences, particularly in the absence of rapid biodegradation.

Other examples of using surfactants to prevent adhesion of bacteria to surfaces exist in the prior art. One class of surfactant that has been seen to exhibit some degree of efficacy is the polyoxyethylene-polyoxypropylene block copolymers. These materials have been demonstrated to have limited usefulness under specific conditions. Some have demonstrated efficacy for inhibiting bacterial colonization of surfaces when applied at reasonably low levels. These materials, however, only displayed efficacy for hydrophobic surfaces.

Examples of nontoxic control of surface colonization typically require the use of high concentrations of surfactants not feasible in water treatment industries where thousands or millions of gallons of water would be treated.

A dialkylsulfosuccinate is known as an effective agent for controlling deposition in various manufacturing processes, such as the papermaking process. A combination of a dialkylsulfosuccinate and an ethylene oxide/propylene oxide block copolymer is also known to control deposition in the paper making process. Concentrated dialkylsulfosuccinates are available as flowing liquids but contain various alcohols or mineral oil. These commercially available products may have concentrations of 70–75% alkylsulfosuccinate, but have flash points as low as 100° F. and contain as much as 7% volatile organic contents (VOCs). Producing a stable, high actives solution without the use of a solvent such as mineral oil or alcohol is difficult, as high actives dialkylsulfosuccinates are waxy solids. One approach is to remove volatile organic contents (VOCs) from the compound. VOC emission limits are being constantly reduced; compounds that are VOC-free are attractive to manufacturers. It is therefore an objective of the present invention to remove VOCs from compounds of this type. By removing VOC content, the flash points of the compounds are increased to over 200° F.

DETAILED DESCRIPTION OF THE INVENTION

The present invention relates to a concentrated composition for controlling deposition having a high flash point and being free of VOC's. Specifically, the composition of the present invention comprises (a) a substantially alcohol-free and mineral oil-free dialkylsulfosuccinate, (b) an ethylene oxide/propylene oxide block copolymer and (c) a mineral acid. In a preferred embodiment, additional components include glycerol and polyethylene or polypropylene glycol.

The dialkylsulfosuccinate is represented by the formula:

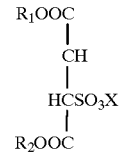

where $R_1$ and $R_2$ are independently selected from an alkyl group having from 5 to 13 carbon atoms and X is selected from the group consisting of an alkali metal, an alkaline rare earth metal, and an ammonium or a substituted ammonium radical. For instance, dioctyl and dinonyl sulfosuccinates will be effective. The ethylene oxide/propylene oxide block copolymer is represented by the formula:

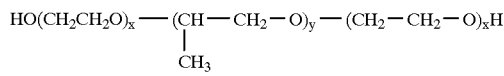

where the sum of x and y is between 200 and 400 and y is an integer between 30 and 80. The polyethylene glycol has a molecular weight less than 400. By mineral acid, it is meant an inorganic acid including, but not limited to sulfuric, phosphoric, nitric or hydrochloric acid.

A particularly preferred embodiment of the present invention (Treatment A) comprises a) at least 20%, and more particularly 20 to 40% of a waxy, solid, alcohol-free, mineral oil-free dioctyl sodium sulfosuccinate, b) at least 20%, more particularly 20 to 40% of an is ethylene oxide/propylene oxide block copolymer, c) at least 20%, more particularly 20 to 50% of polyethylene glycol with a molecular weight of less than 400, d) at least 1%, more particularly 5 to 20% of glycerol, and e) at least 0.1%, more particularly 0.1 to 5% of a mineral acid, e.g., sulfuric acid.

In a preferred embodiment of the present invention, the formulation may be prepared by combining the dialkylsulfosuccinate, polyethylene glycol and glycerol, and heating the mixture. To this blend, which is cloudy, is added the mineral acid; the resulting solution becomes substantially clear. The block copolymer is blended into the mixture, which is then cooled.

The formulations of the present invention are stable, clear, flowable solutions. They remain clear, stable and flowable at temperatures as low as 4° C. (40° F.) and as high as 50° C. (122° F.).

VOC content may be readily calculated by any number of methods available to those skilled in the art. For example, a simple "solids" test may be used by accurately weighing 0.5 grams of sample into a tared flat-bottom dish. Then, 2 ml of 50/50 by volume isopropanol/water solution is added, and swirled gently to mix and distribute the sample. Thereafter, the sample is placed on a hot plate or in an oven at about 110° C. for about one (1) hour, then cooled in a desiccator and weighted to a constant weight. The following calculation is then used to determine VOC content.

% VOC=[1−(grams residue/grams sample)+(% water/100)]×100

Testing of the present invention was carried out in a paper mill. The effectiveness of treatment A, the particularly preferred embodiment of the present invention as noted at page 5 above, was determined at the white water washer screens. In Table I, note the decrease in the number of colony forming units after treatment with the present invention versus the control (no treatment). In Table II, note the reduction in micro-biological deposition with Treatment A versus the control.

TABLE I

Effectiveness of Treatment - White Water Washer Screen

| Treatment | Dosage (ppm) | Colony Forming Units (CFU) |
|---|---|---|
| Control |  | 27,500; 21,275 |
| A | 5 | 11,350; 8,050 |
| A | 10 | 5,900; 5,350 |

TABLE II

Effectiveness of Treatment A
Microbial Deposit Concentration (ug/cm²)

| Days | A | Control |
|---|---|---|
| 0 | 0 | 0 |
| 1 | 29.0 | 31.5 |
| 3 | 29.5 | 50.1 |
| 4 | 33.9 | 50.5 |
| 6 | 20.3 |  |
| 8 | 12.9 |  |
| 10 | 21.1 |  |
| 12 | 19.6 |  |
| 14 | 21.9 |  |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. An antimicrobial composition substantially free of water and volatile organic content, comprising a stable solution of:
   a) a dialkylsulfosuccinate;
   b) an ethylene oxide/propylene oxide block copolymer; and
   c) a mineral acid.

2. The antimicrobial composition as recited in claim 1 further comprising glycerol.

3. The antimicrobial composition as recited in claim 2 further comprising polyethylene glycol.

4. The antimicrobial composition as recited in claim 1 wherein the dialkylsulfosuccinate is of the formula:

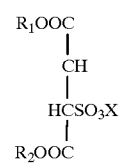

where $R_1$ and $R_2$ are independently selected from an alkyl group having from 5 to 13 carbon atoms, and X is selected from the group consisting of an alkali metal, an alkaline rare earth metal and an ammonium or substituted ammonium radical.

5. The antimicrobial composition as recited in claim 1 wherein the ethylene oxide/propylene oxide block copolymer is of the formula:

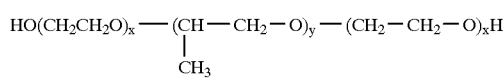

where the sum of x and y is between 200 and 400 and y is an integer between 30 and 80.

6. The antimicrobial composition as recited in claim 3 wherein the mineral acid is sulfuric acid.

7. The antimicrobial composition as recited in claim 3 wherein said polyethylene glycol has a molecular weight less than 400.

8. The antimicrobial composition as recited in claim 1 wherein the dialkylsulfosuccinate is dioctyl sodium sulfosuccinate.

9. An antimicrobial composition substantially free of volatile organic content, comprising a stable solution of:
   a) about 20–40% by weight of a dialkylsulfosuccinate;
   b) about 20–40% by weight of an ethylene oxide/propylene oxide block copolymer;
   c) about 20–50% by weight of polyethylene glycol or polypropylene glycol; and
   d) about 0.1–5% by weight of a mineral acid.

10. The antimicrobial composition as recited in claim 9 further comprising glycerol.

11. The antimicrobial composition as recited in claim 10 wherein said glycerol is about 5–20% by weight.

12. The antimicrobial composition as recited in claim 9 wherein the mineral acid is sulfuric acid.

13. The antimicrobial composition as recited in claim 9 wherein said polyethylene glycol has a molecular weight less than 400.

14. The antimicrobial composition as recited in claim 9 wherein the dialkylsulfosuccinate is dioctyl sodium sulfosuccinate.

15. An antimicrobial composition substantially free of volatile organic content, comprising a stable solution of:
  a) about 20–40% by weight of a dialkylsulfosuccinate;
  b) about 20–40% by weight of an ethylene oxide/propylene oxide block copolymer;
  c) about 20–50% by weight of polyethylene glycol;
  d) about 5–20% by weight of glycerol; and
  e) about 0.1–5% by weight of a mineral acid.

* * * * *